United States Patent [19]
Suzuki

[11] 3,772,962
[45] Nov. 20, 1973

[54] POWER STEERING MECHANISM
[75] Inventor: Akira Suzuki, Kariya city, Aichi pref., Japan
[73] Assignee: Aisin Seiki Kabushiki Kaisha, Kariya City, Japan
[22] Filed: Dec. 24, 1970
[21] Appl. No.: 101,356

[52] U.S. Cl............... 91/359, 91/364, 91/370, 91/375 A, 91/388
[51] Int. Cl................. F15b 13/16, F15b 9/10
[58] Field of Search.......... 91/359, 364, 375 A, 91/388, 372, 370

[56] References Cited
UNITED STATES PATENTS
3,094,010  6/1963  Folkerts................. 91/372
3,099,167  7/1963  Folkerts................. 91/372
3,101,031  8/1963  Crossley, Jr............ 91/364
3,433,127  3/1969  Thompson.............. 91/372

Primary Examiner—Paul E. Maslousky
Attorney—Sughrue, Rothwell, Mion, Zinn & Macpeak

[57] ABSTRACT

This invention relates to power steering mechanisms. More specifically, it relates to improvements in and relating to power steering mechanisms fitted on automotive vehicles.

The improvements comprise the provision of means between sector and steering shafts, said means being effective to reduce the driver's manual effort required for turning the steering wheel a corresponding larger degree responsive to quicker turning of the steering wheel and to reduce said manual effort to a lesser degree for slower turning of said steering wheel.

6 Claims, 3 Drawing Figures

POWER STEERING MECHANISM

This invention relates generally to power steering mechanisms. More specifically, it relates to improvements in and relating to power steering mechanisms fitted on automotive vehicles.

The conventional power steering mechanism is so designed and arranged that the steering is either constant regardless of the steering resistance provided by the vehicle front wheels or varies with such resistance. With such steering mechanism, if the driver desires to operate the steering wheel at a quick speed, the thus required large manual effort imposed upon him will frequently result in a rather slow steering operation, and vice versa, such defective tendency deviating from the driver's true desire may give rise to unstable travelling condition of the vehicle.

The main object of the present invention is to provide an automotive power steeing mechanism having such characteristics that when the steering wheel is operated at a high speed, the steering effort is correspondingly reduced, while the wheel is rotated at a slow speed, the steering effort is correspondingly increased for avoiding the aforementioned conventional drawback.

This and further objects, features and advantages of the invention will become more clear when read the following detailed description of the invention by reference to the accompanying drawings, illustrative of a preferred embodiment of the invention.

Figure 1:
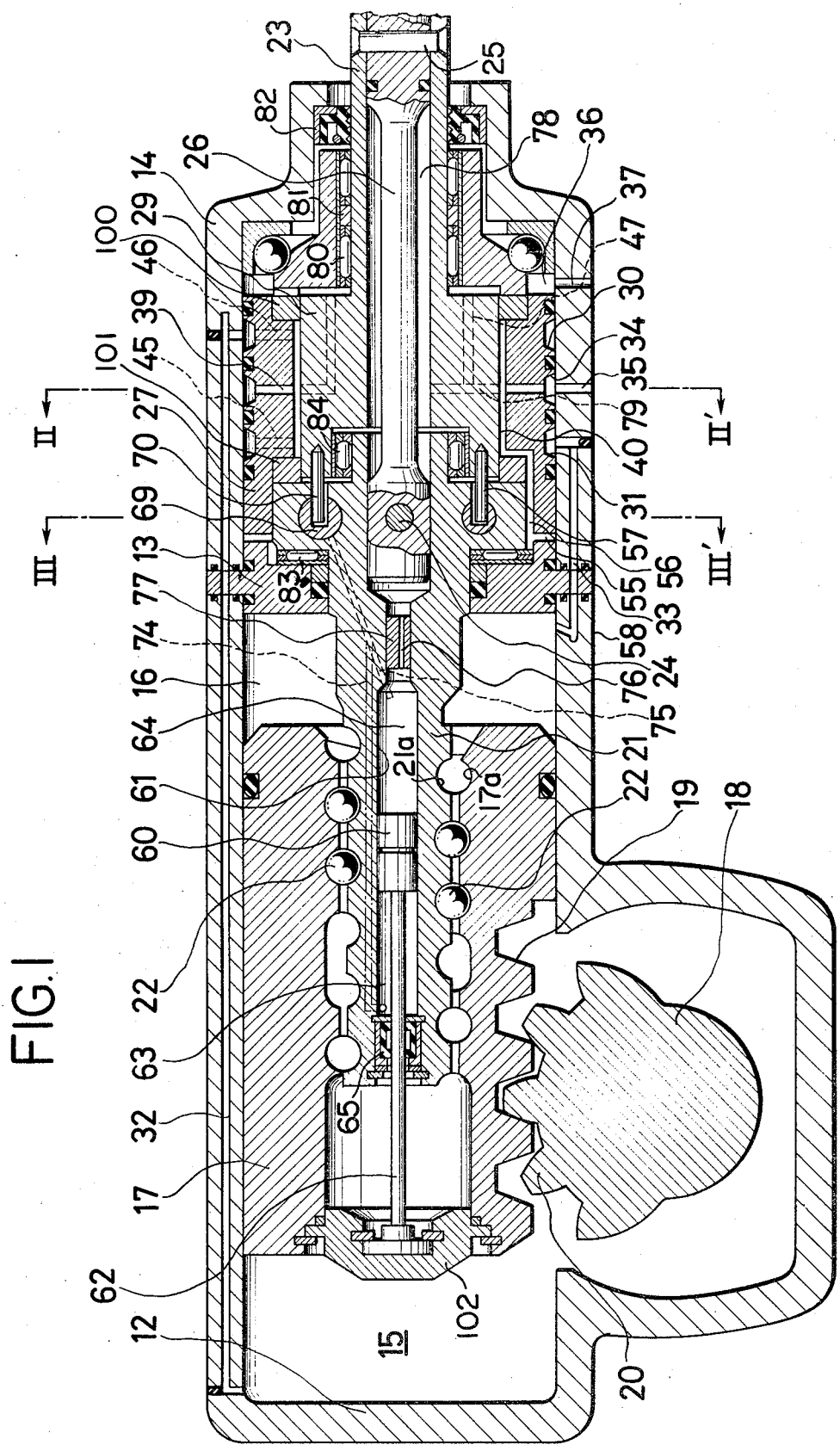
FIG. 1 is a central and longitudinal section of a preferred embodiment of the invention.

Referring now to the accompanying drawing, the sole representative embodiment will be described in detail herein below.

In the drawings, numeral 11 represents main part of the power steering mechanism according to this invention which comprises a gear housing 12, an intermediate body 13 and an oil pressure control valve casing 14 rigid with each other, although the necessary fixing means such as bolts and the like have been omitted for simplicity. Within the gear housing 12, a piston 17 is slidably mounted which divides the interior space defined by the intermediate body 13 and the housing 12 into two separated liquid chambers 15 and 16.

Numeral 18 denotes a sector shaft which is connected through conventional coupling mechanism with a automotive steering handle, although not specifically shown only for its very popular nature and simplicity of the drawing. This sector shaft 18 is formed integrally with pinion teeth 20 which are kept in mesh with rack teeth 19 formed on said piston 17.

Actuating shaft 21 is arranged concentrically with said piston 17, said shaft and said piston being formed with mating screw grooves 21a and 17a, respectively, which are arranged to cooperate with each other through a number of balls 22, so as to provide a ball-screw coupling between the both.

Figure 3:
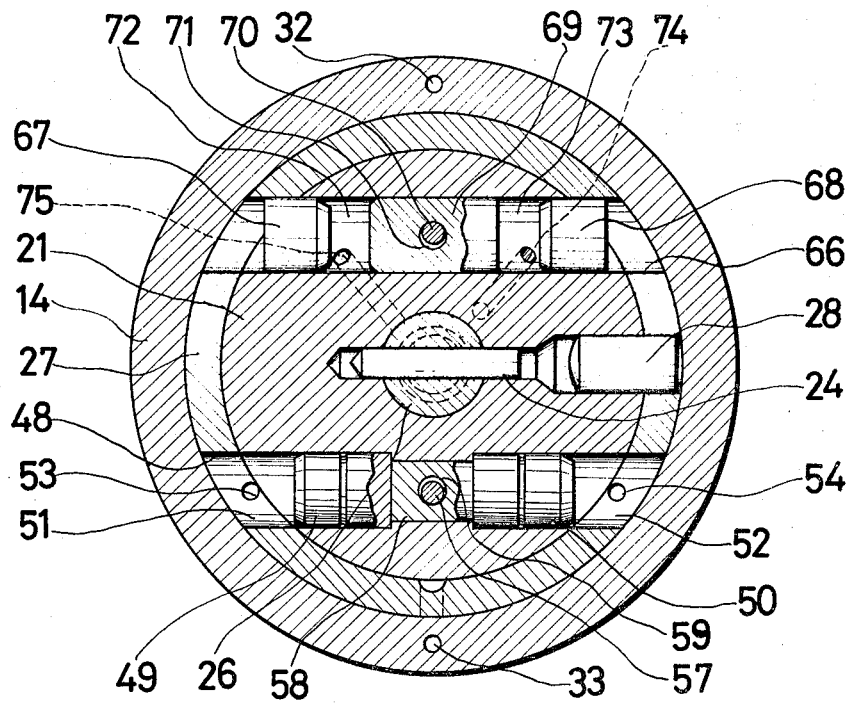
FIG. 3 is a cross-section taken substantially along a section 3—3 shown in FIG. 1.

A hollow steering shaft 23 is arranged coaxially with said actuating shaft 21 and a torsion bar 26 is arranged concentrically with said shaft 23 and fixed rigidly at its both ends to said shafts 21 and 23 by means of pins 24 and 25. Numeral 27 represents a ring-shaped control valve member which is rotatably mounted within the bore of valve casing 14 and connected with the shaft 21 by means of a pin 28, as shown in FIG. 3.

Numeral 29 represents a rotating member for said oil pressure control valve and forms a part of said steering shaft 23, said steering shaft 23 being operatively connected with said control valve by means of two separate connection rings 100 and 101 for performing unitary motion therewith. The connection of these rings to the control valve and member 29 can be made by pressure fit or the like conventional fixing procedure. Control valve member 27 as an outer member and rotating member 29 as an inner member, in combination constitute a control valve unit.

Circumferential grooves 30 and 31 are formed in the outer peripheral surface of the control valve 27 and are kept in fluid communication through passage duct means 32 and 33 to said liquid chambers 15 and 16, respectively.

A further circumferential groove 34 is formed on the control valve 27 and hydraulically connected through passage duct means 35 formed in the body member 14 to a pressure oil supply source, P. A ring space 36 is connected through passage duct means 37 to an oil reservoir, R.

Control valve 27 is formed with four separate recesses 38 in the interior wall surface which slidably cooperate with the rotatable member 29.

In addition, further four recesses 40 are equally formed on the control valve 27 and kept in fluid communication with respective radial passages 39 formed through the body of the valve 27. Each four projections 41 and 42 are formed on the member 29 in respectively corresponding manner with said two groups of recesses 38 and 40. By the provision of projections 41 and 42, eight recesses 43 and 44 are formed on the member 29 as seen. Sufficient clearance is provided between the projections 41 and 42 on rotatable member 29 and the edges of recesses 38 and 40 formed in control valve 27 to permit fluid flow from the recesses 40 in control valve 27 to recesses 43 and 44 formed in the rotatable member 29 when the vehicle steering wheel is in its neutral position, as will be described hereinafter. Circumferential grooves 30 and 31 are kept in fluid communication through passage conduit means 45 and 46 formed in control valve 27, respectively, and further with recesses 43 and 44. Axially extending passage bores 47 are kept in fluid communication with ring chamber 36, on the one hand, and with respective radial passage bores 47a formed in said projections 41, on the other hand.

As shown most clearly in FIG. 3, a lateral bore 48 is formed commonly through actuating shaft 21 and control valve 27, said bore 48 receiving slidably therein reaction pistons 49 and 50. In the bore 48 and as defined by the reaction piston, there are two reaction chambers 51 and 52, the outer extremities of which are defined by the inside wall surface of control valve casing 14.

These reaction chambers 51 and 52 are kept in fluid communication through respective passage ducts 53 and 54 axially bored in the control valve 27 to ring chamber 55, and through passage bore 56 to any one of said recesses 40.

Pin 57 fixed to the shaft 23 is kept in engagement with a groove 59 formed in a holding piston 58 arranged between said pistons 49 and 50.

A hydraulic piston 60 is slidably received in an axial bore 61 with slidable gaps, said bore being bored through the actuating shaft 21 and a rod 62 being formed rigidly with the holding piston and passing through a sealing unit 65 to stopper means 102 fixedly attached to one end of said piston 17.

By the provision of the piston 60, two separate pressure chambers 63 and 64 are formed at the both sides thereof. A further lateral bore 66 is formed commonly through the shaft 21 and the control valve 27, as seen in FIG. 3, said bore 66 being fitted with a pair of plugs 67 and 68 held firmly in position by pressure fit or the like conventional fixing measure. A control piston 69 is slidably mounted in the bore 66 and positioned in the space defined between said plugs 67 and 68, a pin 70 attached fixedly to the manipulating shaft 23 being kept in engagement with a groove 71 formed in the control piston 69.

Two separate control chambers 72 and 73 are provided between plug 67 or 68 and control piston 69, respectively. Chamber 72 is kept in fluid communication through passage duct means 74 to said pressure chamber 63. In the similar way, chamber 73 is kept in communication through passage bore means 75 to said pressure chamber 64. Numeral 76 represents a passage duct having a small cross-sectional area and bored through a plug 77 press-fit in the reduced part of the axial bore formed through said actuating shaft 21. Leakage oil from this passage duct 66 will be conveyed to the chamber 78, thence through passage duct means 79 and 47 to said ring chamber 36.

Additionally numerals 80;81 denote a needle bearing unit; and numeral 82 denotes sealing means; and 83 and 84 needle bearing units, these numbers are positioned as shown for carrying out the operation to be described.

The operation of the mechanism so far shown and described is as follows.

Figure 2:
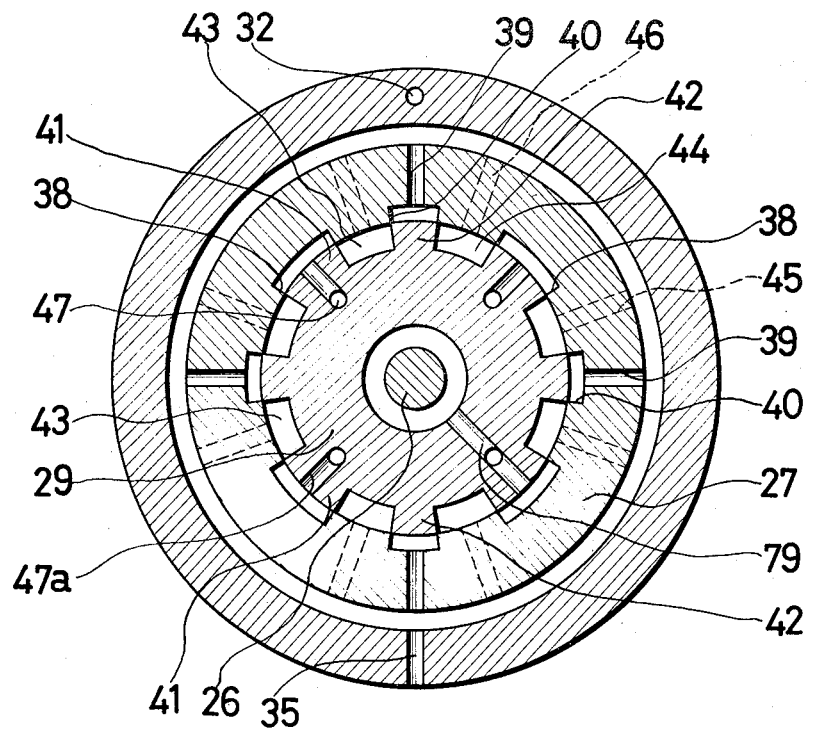
FIG. 2 is a cross-section of the mechanism shown in FIG. 1, being taken substantially along a section line 2—2 shown therein.

With the automotive steering wheel, not shown, positioned in its neutral, the control valve 27 operatively connected therewith is positioned as shown in FIG. 2. Pressure oil supplied from the supply source, not shown, is conveyed through passage duct 35 in valve casing 14; circumferential groove 34 on control valve 27, oil passages 39 and recesses 40 to recesses 43 and 44 on the member 29, thence through recesses 38, axial passage bore 47 and ring chamber 36 to the oil reservoir, not shown. Thus, no oil pressure will be prevailing in the liquid chambers 15 and 16.

With the steering wheel rotated in a certain one direction such as clockwise, torque is transmitted therefrom to the shaft 23 and bar 26 which are thus subjected to torsion. Therefore, the rotatable member 29 is rotated slightly clockwise in FIG. 2, thus the degree of fluid communication between recesses 40 and 43 becoming larger than before, while fluid communication between recesses 40 and 44 being thereby interrupted. The pressure oil conveyed to recesses 43 will be further conveyed through passage ducts 45 and 33 to liquid chamber 16. By the oil pressure thus prevailing in this chamber 16, piston 17 is caused to slide leftwards in FIG. 1. Motion is thus transmitted from rack teeth 19 to the mating pinion 20, so as to rotate the sector shaft 18, thence to the automotive wheel steering means, not shown, for directional control of the automotive front wheels.

By the leftward sliding movement of piston 17, the pressure oil prevailing in the chamber 15 is conveyed through passage duct 32, circumferential groove 30, oil passage 46, recesses 44 and 38, passage bore 47 to ring chamber 36, thence back to the oil reservoir.

By the leftward movement of piston 17, piston 60 made rigid with the latter is moved leftwards in the cylinder bore 61 and the pressure-increased oil in pressure chamber 63 will be conveyed through passage duct 74 to control chamber 73. The more rapid the rotational speed of steering wheel in clockwise direction, not shown, the higher pressure oil will be conveyed to the control chamber 73, so that the steering shaft 23 is rotated clockwise to a larger degree through the intermediary of piston 69 and pin 70.

Since pressure chambers 51 and 52 are kept in fluid communication through passage conduit means 53 and 54 to ring chamber 55, thence through passage conduit 56 to recesses 40 to power supply source, not shown, pressure liquid contained in control chamber 72 will rotate the steering shaft 23 clockwise and reaction piston 49 is moved leftwards in FIG. 3 through pin 57 and holder piston 58, thus reaction being transmitted to the shaft 23.

With slower clockwise rotation of steering wheel, and thus, with slower axial movement of piston 17 acted upon by the hydraulic pressure in liquid chamber 16, the pressure liquid prevailing in pressure chamber 63 is liable to pass through the small gaps defined between cylinder 61 and piston 60. Therefore, the hydraulic pressure in pressure chamber 63 will become lower than that which develops with quicker rotation of the steering wheel. The hydraulic pressure developed in pressure chamber 63 will be conveyed to control chamber 72, as was referred to above, for rotating the steering shaft 23 in the same sense.

This controlling force acting upon the shaft 23 is responsive to the hydraulic pressure in the control chamber 72. Therefore, with quicker rotation of steering wheel, a correspondingly increased controlling force is generated and vice versa.

When the steering wheel is rotated in the reversed or counter clockwise direction, pressure liquid from the supply source, not shown, is conveyed through recesses 44, passage conduit means 46 and 32 to liquid chamber 15, so as to shift the piston 17 rightwards in FIG. 1. By this shifting movement of the piston, motion is transmitted through the rack-and-pinion engagement at 18;19 and the conventional coupling and/or other transmission means, not shown, to the steering wheel shaft, not shown, for performing the desired direction control of the automotive front wheels.

With rightward movement of piston 17, the piston 60 integral with the latter is shifted in the same direction within the cylinder 61. When the steering wheel is rotated at a high turning speed in this case, the pressure liquid prevailing in pressure chamber 64 will become difficult to pass through the small gap defined between piston 60 and cylinder 61, thus the liquid pressure in the chamber 64 in communication with control chamber 73 being increased and accumulated therein, and vice versa.

In this case, liquid is supplied from the chamber 78 through plug bore 76 to the chamber 64. Therefore, it will be seen from the foregoing that the driver's turning effort on the steering wheel will become lessened when it is rotated at a high speed than in the case of a slower rotation of the wheel.

With use of the aforementioned mechanism according to this invention, the steering manual effort can be correspondingly and appreciably reduced in case of quicker manipulating turn of the steering wheel. On the contrary, when the driven turns the steering wheel at a slower speed, the manual turning effort will be also reduced, but at a correspondingly lesser degree in comparison with the case of higher speed turning of the wheel.

The above structural and functional feature of the steering mechanism according to this invention will guarantee a quick and lighter steering of the vehicle which may be frequently required, for instance, when the vehicle is operated in a crowded parking area. As a further example, when the vehicle requires a quick and effective steering when travelling along a street road or a hard, muddy or icy road, or along a sharply curved course at high speed, practically no steering lag may be encountered.

As described above, when the automotive steering wheel, not shown, is rotated in the other direction, such as counter-clockwise, the torque is transmitted therefrom to the shaft 23 and bar 26 in the opposite direction, thereby subjecting these members to an opposite torque. Thus, the same hydraulic actuation will take place in the opposite direction, that is, the hydraulic forces will be conveyed to hydraulic chambers 15 and 16 and thus be applied to member 17 in the opposite direction. In addition, fluid communication between the recesses in members 27 and 29 will be just the opposite of that described previously, thereby causing the same operation to be carried out with regard to the components shown in FIG. 3.

In addition, when the steering wheel or handle is kept at its holding position which means that it is positioned for straight line travelling of the vehicle, the steering resistance will be rather heavier so that an appreciably stabilized steering feeling is felt by the vehicle driver.

What is claimed is:

1. A power steering unit for a powered and wheeled vehicle comprising:
 a sector shaft;
 an actuating cylinder;
 a piston slidably mounted within said cylinder and operatively connected with said sector shaft;
 an actuating shaft operatively connected with said piston through a ball-screw coupling;
 a steering shaft;
 torsion means elastically connecting said steering shaft with said actuating shaft;
 a control valve arranged between said actuating shaft and said steering shaft;
 two separate liquid chambers formed within said cylinder and separated by said piston from each other, said control valve being adapted for distributing pressure liquid to either of said liquid chambers during turning movement of said steering shaft and for bringing said both chambers into fluid communication with each other when said steering shaft is positioned in its neutral position, said torsion means provided between said sector and steering shafts being effective to reduce a driver's manual effort required for turning said steering shaft a corresponding larger degree responsive to quicker turning of said steering shaft and to reduce said manual effort to a lesser degree for slower turning of said steering shaft.

2. A power steering unit as set forth in claim 1, further comprising, a first bore axially formed in the actuating shaft, a second piston slidably mounted within said bore and movable in response to said first piston, two pressure chambers formed within said bore at both sides of said second piston, a second bore formed in the actuating shaft, a third piston slidably mounted in said second bore and divided into two control chambers at the both sides thereof, a connecting member attached to said steering shaft and engaged with the third piston, and passage means connecting one of said pressure chambers with one of said control chambers and connecting the other of said pressure chambers with the other of said control chambers, respectively.

3. A power steering unit as set forth in claim 2, wherein said control vlave comprises an outer valve member fixedly secured to said actuating shaft and formed with a plurality of recesses at the interior surface thereof, and an inner valve member integrally formed with said steering shaft and formed with a plurality of projections corresponding to said recess, one of said recesses being connected with a pressure source and the other of said recesses being connected with an oil reservoir.

4. A power steering unit as set forth in claim 2, wherein said second bore is fitted with a pair of plugs, and said connecting member is a pin.

5. A power steering unit as set forth in claim 2, further comprising, a third bore formed through said actuating shaft, a pair of reaction pistons slidably mounted in said third bore, a holding piston arranged between said reaction pistons and engaged with a pin attached to the steering shaft, and two reaction chambers formed within said third bore and separated from each other by said reaction pistons, each one of said reaction chambers being connected with any one of said recesses, respectively.

6. A power steering unit as set forth in claim 2, further comprising, a fourth bore formed through said actuating shaft and steering shaft, said torsion means comprising a torsion member mounted within said fourth bore and fixed elastically at its both ends to said actuating and steering shafts, respectively, and a chamber formed by a small diameter of the torsion member and said fourth bore, said chamber being connected with said one of the pressure chambers through an orifice means.

* * * * *

UNITED STATES PATENT OFFICE
CERTIFICATE OF CORRECTION

Patent No. 3,772,962                                  Dated November 20, 1973

Inventor(s) Akira SUZUKI

It is certified that error appears in the above-identified patent and that said Letters Patent are hereby corrected as shown below:

Claim of priority has been omitted.

Japan                                                104674/69, filed

December 24, 1969.

Signed and sealed this 16th day of July 1974.

(SEAL)
Attest:

McCOY M. GIBSON, JR.                         C. MARSHALL DANN
Attesting Officer                            Commissioner of Patents